United States Patent
Fukuta et al.

(10) Patent No.: US 8,399,154 B2
(45) Date of Patent: Mar. 19, 2013

(54) METHOD FOR PRODUCING AN ANION-EXCHANGE MEMBRANE FOR A SOLID POLYMER ELECTROLYTE TYPE FUEL CELL

(75) Inventors: Kenji Fukuta, Tsukuba (JP); Shin Watanabe, Tsukuba (JP); Hiroyuki Yanagi, Tsukuba (JP)

(73) Assignee: Tokuyama Corporation, Yamaguchi (JP)

(*) Notice: Subject to any disclaimer, the term of this patent is extended or adjusted under 35 U.S.C. 154(b) by 22 days.

(21) Appl. No.: 13/121,966

(22) PCT Filed: Oct. 6, 2009

(86) PCT No.: PCT/JP2009/067376
§ 371 (c)(1),
(2), (4) Date: Mar. 31, 2011

(87) PCT Pub. No.: WO2010/041641
PCT Pub. Date: Apr. 15, 2010

(65) Prior Publication Data
US 2011/0207028 A1    Aug. 25, 2011

(30) Foreign Application Priority Data
Oct. 6, 2008 (JP) .................. 2008-259835

(51) Int. Cl.
*H01M 8/00* (2006.01)
(52) U.S. Cl. ........................ 429/535
(58) Field of Classification Search ............ None
See application file for complete search history.

(56) References Cited

U.S. PATENT DOCUMENTS

| | | | |
|---|---|---|---|
| 5,118,717 A | 6/1992 | Hodgdon et al. | |
| 5,284,879 A * | 2/1994 | Hodgdon et al. | ........... 521/27 |
| 6,183,914 B1 | 2/2001 | Yao et al. | |
| 8,148,030 B2 | 4/2012 | Isomura et al. | |
| 2002/0019448 A1 | 2/2002 | Sugaya et al. | |
| 2002/0028887 A1 | 3/2002 | Hirano et al. | |
| 2009/0263699 A1 | 10/2009 | Sadasue et al. | |
| 2010/0297530 A1 | 11/2010 | Isomura et al. | |
| 2011/0195323 A1 | 8/2011 | Inoue et al. | |

FOREIGN PATENT DOCUMENTS

| | | |
|---|---|---|
| JP | 11135137 A | 5/1999 |
| JP | 11273695 A | 10/1999 |
| JP | 2000331693 A | 11/2000 |
| JP | 2002105138 A | 4/2002 |

(Continued)

OTHER PUBLICATIONS

PCT Application No. PCT/JP2009/067376, Translation of the International Preliminary Report on Patentability.

(Continued)

*Primary Examiner* — Patrick Ryan
*Assistant Examiner* — Wyatt McConnell
(74) *Attorney, Agent, or Firm* — Cahn & Samuels, LLP

(57) ABSTRACT

An anion-exchange membrane having quaternary ammonium groups or quaternary phosphonium groups wherein halogen ions serve as the counter ions is obtained. Rather than being subjected to ion exchange with an OH-type membrane using a toxic substance such as sodium hydroxide, the halogen-type anion exchange membrane is brought into contact with a carbonate solution and/or bicarbonate solution to directly obtain an anion exchange membrane where at least some of the counterions of the quaternary ammonium groups or quaternary phosphonium groups are $CO_3^{2-}$ and/or $HCO_3^-$.

13 Claims, 1 Drawing Sheet

FOREIGN PATENT DOCUMENTS

| | | |
|---|---|---|
| JP | 2002114854 | 4/2002 |
| JP | 2002367626 A | 12/2002 |
| JP | 2004206899 | 7/2004 |
| JP | 2009203455 | 9/2009 |
| WO | 2008053770 A1 | 5/2008 |
| WO | 2009096473 A1 | 8/2009 |
| WO | 2010041642 A1 | 4/2010 |

OTHER PUBLICATIONS

English Abstract of JP 111351 A1.
English Abstract of JP 11273695 A1.
English Abstract of JP 2000331693 A1.
English Abstract of JP 2002367626 A1.
English Abstract of JP 2002105138 A.
English Abstract of JP 2004206899.
English Abstract of JP 2002114854.
English Abstract of JP 2009203455.
English Abstract of JP 2002525803 T.
Supplementary European Search Report dated Set. 7, 2012. EP Application No. 09819175.2.
English Abstract of WO 2009096473.
English Abstract of WO 2010041642.
English Abstract of WO 2008053770.

* cited by examiner

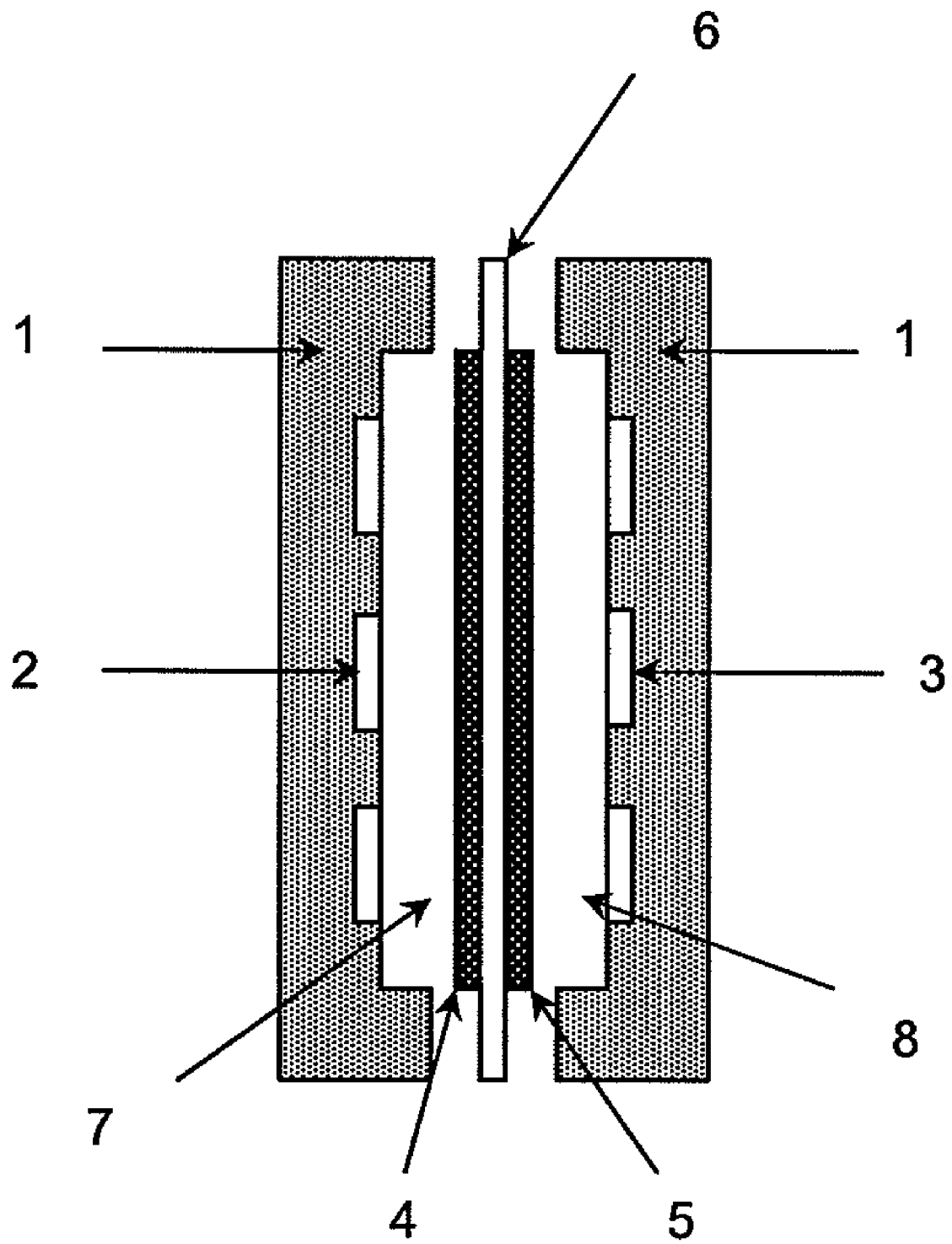

METHOD FOR PRODUCING AN ANION-EXCHANGE MEMBRANE FOR A SOLID POLYMER ELECTROLYTE TYPE FUEL CELL

This application is a U.S. national stage application of PCT/JP2009/067376 filed on Oct. 6, 2009 which claims priority of Japanese patent document 2008-259835 filed on Oct. 6, 2008, the entireties of which are incorporated herein by reference.

TECHNICAL FIELD

The present invention relates to a method for producing an anion-exchange membrane used in a solid polymer electrolyte type fuel cell.

BACKGROUND OF THE INVENTION

A solid polymer type fuel cell is a fuel cell using a solid polymer such as ion-exchange resin as an electrolyte, and is relatively low in operation temperature. The solid polymer type fuel cell has, as shown in FIG. 1, a basic structure wherein a space surrounded by cell bulkhead 1 having a fuel flow hole 2 and oxidizing agent gas flow hole 3, respectively communicated with outside, is divided by a membrane assembly in which a fuel chamber side catalyst electrode layer 4 and an oxidizing agent chamber side catalyst electrode layer 5 are bonded to both surfaces of a solid polymer electrolyte membrane 6 respectively, to form a fuel chamber 7 communicated with outside via the fuel flow hole 2 and an oxidizing agent chamber 8 communicated with outside via the oxidizing agent gas flow hole 3. Then, in the solid polymer type fuel cell having the above basic structure, a fuel such as hydrogen gas or liquid fuel including methanol, etc. is supplied into said fuel chamber 7 via the fuel flow hole 2, and oxygen or oxygen containing gas such as air to act as an oxidizing agent is also supplied into the oxidizing agent chamber 8 via the oxidizing agent gas flow hole 3. Furthermore, an external load circuit is connected between both catalyst electrode layers to generate electric energy by the following mechanism.

When using a cation-exchange membrane as the solid polymer electrolyte membrane 6, a proton (hydrogen ion) generated by contacting a fuel with a catalyst included in the electrode in the fuel chamber side catalyst electrode layer 4 conducts in the solid polymer electrolyte membrane 6 and moves into the oxidizing agent chamber 8 to generate water by reacting with oxygen in the oxidizing agent gas in the oxidizing agent chamber side catalyst electrode layer 5. On the other hand, an electron, generated in the fuel chamber side catalyst electrode layer 4 simultaneously with the proton, moves to the oxidizing agent chamber side catalyst electrode layer 5 through the external load circuit, so that it is possible to use the above reaction energy as an electric energy.

As a cation-exchange membrane used in the fuel cell as the solid polymer electrolyte membrane, a perfluorocarbon sulfonic acid resin membrane is most commonly used. However, in the fuel cell using the perfluorocarbon sulfonic acid resin membrane, there are big problems such that only noble metal catalyst is usable due to the strongly acidic reaction field, and that the perfluorocarbon sulfonic acid resin membrane is also expensive, resulting in limitations in cost reduction.

To solve the above-mentioned problems, it has been examined to use an anion-exchange membrane instead of perfluorocarbon sulfonic acid resin membrane, and several of such solid polymer type fuel cells have been already proposed (Patent Articles 1 to 4). Since the reaction field is basic in the fuel cell using the anion-exchange membrane, catalysts other than noble metal catalyst can be used. In this case, the mechanism for generating electric energy in the solid polymer type fuel cell is different in ion species moving through the inside of the solid polymer electrolyte membrane 6. Namely, hydrogen gas or methanol and the like is supplied to the fuel chamber side, and oxygen and water are supplied to the oxidizing agent chamber side, so that the catalyst included in the electrode is contacted with the supplied oxygen and water to generate a hydroxy-ion in the oxidizing agent chamber side catalyst electrode layer 5. The hydroxy-ion conducts in the above solid polymer electrolyte membrane 6 comprised of a hydrocarbon-based anion-exchange membrane and moves to the fuel chamber 7 to generate water by reacting with fuel in the fuel chamber side catalyst electrode layer 4. Along with the above, an electron generated in the fuel chamber side catalyst electrode layer 4 is moved via the external load circuit into the oxidizing agent chamber side catalyst electrode layer 5, and the reaction energy is used as electric energy.

Also, in the solid polymer type fuel cell using the anion-exchange membrane, it is expected to notably inhibit the phenomenon to permeate methanol and the like as fuel from the fuel chamber side to the oxidizing agent chamber side, i.e. crossover, which is a problem with the use of the cation-exchange membrane, especially the above-mentioned perfluorocarbon sulfonic acid resin membrane. Because of the difference in atmosphere of both electrodes and the expanded scope of selection of usable catalyst types, it is further expected to improve electric voltage due to lowered overvoltage of oxygen reduction, availability of fuel having carbon-carbon bond, the selection of a catalyst for the oxidizing agent side inactive for the crossovered fuel, etc.

As the anion-exchange membrane 6 used in the solid polymer type fuel cell using an anion-exchange membrane, in general, there can be used a membrane having a copolymer of a monomer such as styrene, vinyl toluene, ethyl styrene, vinylpyridine and vinylpyrazine and a crosslinkable monomer such as divinylbenzene, trivinylbenzene, divinyl toluene and divinyl xylene as its base, and normally including a quaternary ammonium group, quaternary phosphonium group and the like as its anion-exchange group. The anion-exchange membrane is normally produced by mixing a monomer having a functional group convertible to the above quaternary ammonium group or quaternary phosphonium group with other monomer, followed by polymerization to form a membrane-like material, and then converting the functional group to a quaternary onium group, and there may be mentioned the following production methods a) to c), for example.

a) a method in which a raw membrane having a halogenoalkyl group for forming an anion-exchange membrane is reacted with an agent having a tertiary amino group for forming quaternary ammonium or an agent having a tertiary phosphine group for forming quaternary phosphonium quaternary phosphonium;

b) a method in which a raw membrane having a tertiary amino group or tertiary phosphine group for forming an anion-exchange membrane is reacted with an alkylating agent having a halogenoalkyl group; and c) a method in which a polymerizable composition including a polymerizable monomer containing a quaternary ammonium group or quaternary phosphonium group having a halogeno ion as its counterion is polymerized.

In the production methods, the counterion of the above quaternary ammonium group and quaternary phosphonium group is normally a halogeno ion such as chloride ion and bromide ion in the obtained anion-exchange membrane.

When an anion-exchange membrane having a halogeno ion, such as chloride ion, as its counterion (hereinafter, this anion-exchange membrane may also be referred to as "halogen type ion-exchange membrane") is used as the solid polymer electrolyte membrane of a fuel cell, catalyst poisoning due to the halogeno ion can be concerned. Furthermore, in the resulting solid polymer type fuel cell, the halogeno ion competes in conduction against the hydroxy-ion in the anion-exchange membrane to increase the internal resistance of the cell and to decrease the concentration of the hydroxy-ion as an electrode reacting species, so that the fuel cell output is declined. In these conditions, it is highly preferable to preliminarily ion-exchange the counterion of the anion-exchange membrane from the halogeno ion to the above hydroxy-ion (hereinafter this anion-exchange membrane may also be referred to as "OH type anion-exchange membrane") to eliminate such catalyst poisoning and further to increase the concentration of the hydroxy-ion as a conducting species as well as the electrode reacting species. As the method, there may be mentioned a method in which the halogen type anion-exchange membrane is produced followed by impregnation of the same with a solution of sodium hydroxide (NaOH).

However, sodium hydroxide (NaOH) is a strongly basic deleterious substance, and ion-exchange operation with the above solution of sodium hydroxide requires careful handling in view of safety and the like.

Also, repeated impregnation is required with exchanging the sodium hydroxide solution to a new one because the ion-exchange from the halogen ion to the hydroxy-ion via impregnation with the sodium hydroxide solution is inefficient and only one impregnation is insufficient. Consequently, the ion-exchange operation requires long time, and complicated operations such as exchange of the sodium hydroxide solution.

Furthermore, the OH type anion-exchange membrane produced with strongly basic solution is slightly lowered in ion-exchange capacity compared to the original halogen type anion-exchange membrane, which makes it difficult to produce an anion-exchange membrane having stable ion conductivity. This may be because a part of quaternary ammonium groups is degraded due to the severe condition at the time of the above impregnation with the sodium hydroxide solution (Patent Document 5).

[Patent Document 1] The Japanese Unexamined Patent Publication H11-135137

[Patent Document 2] The Japanese Unexamined Patent Publication H11-273695

[Patent Document 3] The Japanese Unexamined Patent Publication 2000-331693

[Patent Document 4] The Japanese Unexamined Patent Publication 2002-367626

[Patent Document 5] The Japanese Unexamined Patent Publication 2002-105138

As stated above, when an anion-exchange membrane is used as a solid polymer electrolyte in a solid polymer electrolyte type fuel cell, an OR type counterion, instead of a halogen type counterion, can advantageously be used as a counterion of the anion-exchange membrane, but the ion-exchange operation has not been well developed. Therefore, it has been a big problem to develop a method for producing such an anion-exchange membrane for a solid polymer electrolyte type fuel cell, safe and easy in operation, and able to highly inhibit degrading a quaternary ammonium base to obtain high battery output.

SUMMARY OF THE INVENTION

The present inventors have variously studied ion-exchange of the counterion of the produced chlorine type anion-exchange membrane in view of the above circumstances. As a result, it was found that the OH type anion-exchange membrane obtained by the above ion-exchange with the sodium hydroxide solution does not remain stable, but absorbs carbon dioxide in the air to rapidly substitute the counterion from $OH^-$ to $CO_3^{2-}$, followed by further conversion of the $CO_3^{2-}$ to $HCO_3^-$. The counterion is thus converted from $OH^-$ to $HCO_3^-$ at a speed to complete the substitution of about 90% or more the counterion for 10 hours when it is left at room temperature in the air, which confirms that the large majority of the counterions in the OH type anion-exchange membrane obtained by the above ion-exchange are $HCO_3^-$ at the start of actual use.

Furthermore, the present inventors found that the counterions such as $CO_3^{2-}$ and $HCO_3^-$ are immediately ion-exchanged again by $OH^-$ generated via the reaction in the oxidizing agent chamber side electrode to be released outside as carbon dioxide during generating electricity of the cell even in the anion-exchange membrane having $CO_3^{2-}$ and $HCO_3^-$ as the counterion when the membrane is used in the fuel cell. Namely, the fuel cell in operation exhibits high ion conductivity and electrode reactivity even when using the above $CO_3^{2-}$ type or $HCO_3^-$ type anion-exchange membrane because of the re-conversion of the counterions during the operation of the fuel cell. Note that the chloride ions cannot be released outside the system when operating the fuel cell where the counterions remain as chloride ions as in prior arts, and therefore, there is substantially no ion-exchange by hydroxy-ions generated in electrode reaction.

Also, as a result of studies, it was found that the ion-exchange rate of the chloride ion present as the counterion of the anion-exchange membrane is larger in ion-exchange with $CO_3^{2-}$ and $HCO_3^-$ than in ion-exchange with $OH^-$.

Based on the above findings, the present inventors reconsidered the problems on ion-exchange of the counterion of the chlorine type anion-exchange membrane, and found that all the above problems can be solved by bringing the membrane into contact with carbonate solution and/or bicarbonate solution to directly ion-exchange the counterion of the chlorine type anion-exchange membrane to $CO_3^{2-}$ type and $HCO_3^-$ type instead of using the sodium hydroxide solution to ion-exchange to OH type, so that the present invention came to be completed.

Namely, the present invention relates to a method for producing an anion-exchange membrane for a solid polymer electrolyte type fuel cell comprising preparing an anion-exchange membrane including a quaternary ammonium group or quaternary phosphonium group having a halogeno ion as a counterion, bringing the anion-exchange membrane into contact with carbonate solution and/or bicarbonate solution to obtain an anion-exchange membrane wherein at least a part of counterions of the quaternary ammonium group or quaternary phosphonium group is $CO_3^{2-}$ and/or $HCO_3^-$.

According to the method for producing an ion-exchange membrane of the present invention, in the anion-exchange membrane including a quaternary ammonium group or quaternary phosphonium group which is normally produced to have halogen type counterion such as chlorine, the halogeno ion is directly ion-exchanged to $CO_3^{2-}$ type and/or $HCO_3^-$ type (hereinafter this counterion type may also be referred to as "carbonate/bicarbonate type"), instead of ion-exchange of the counterion to OH type followed by further ion-exchange to the carbonate/bicarbonate type due to absorption of carbon dioxide in the air. The ion-exchange of the counterion from the halogen type to the carbonate/bicarbonate type can be done with weakly-basic solution of carbonate and bicarbonate, so that safety and certainty in operation can greatly be improved compared to ion-exchange to OH type by using deleterious substance such as sodium hydroxide.

Since carbonate ion and bicarbonate ion are more easily ion-exchanged than hydroxy-ion, the counterions can immediately be ion-exchanged when using carbonate solution or bicarbonate solution for the above ion-exchange of the counterion, compared to using the sodium hydroxide solution. Consequently, it is advantageous that the ion-exchange step can rapidly be done without complicated operation such as frequent change of the sodium hydroxide solution.

Furthermore, the counterion can be thus ion-exchanged under mild conditions with weakly basic solution, so that the load to the anion-exchange membrane is small, and in particular, it is possible to highly inhibit degrading the quaternary ammonium group and quaternary phosphonium group, which are inferior in stability under the strongly basic conditions. Therefore, the anion-exchange capacity of the ion-exchanged chlorine type anion-exchange membrane can remain unchanged, resulting in great effect that the desired anion-exchange membrane can constantly be produced. Note that even when directly obtaining the carbonate/bicarbonate type anion-exchange membrane without passing through OH type membrane, the counterions, i.e. $CO_3^{2-}$ and $HCO_3^-$, are immediately ion-exchanged again by $OH^-$ generated through the reaction in the oxidizing agent chamber side electrode and released outside as carbon dioxide during the use of the fuel cell as in the above carbonate/bicarbonate type membrane obtained by conversion of OH type membrane due to the absorption of carbon dioxide in the air. Therefore, the resulting membrane shows sufficient hydroxy-ion conductivity and electrode reactivity, and the fuel cell produced with this membrane operates with high output.

BRIEF DESCRIPTION OF THE DRAWINGS

FIG. 1 is a conceptual diagram showing the basic structure of the solid polymer type fuel cell.

DETAILED DESCRIPTION OF THE INVENTION

In the present invention, an anion-exchange membrane including a quaternary ammonium group or quaternary phosphonium group which has a halogeno ion as a counterion is first obtained. As the quaternary ammonium group, there may be mentioned a trialkylammonium group such as trimethylammonium group, triethylammonium group, tripropylammonium group, tributylammonium group, trioctylammonium group, diethylmethylammonium group, dipropylmethylammonium group, dibutylmethyl ammonium group, dimethylethylammonium group and methyldi(hydroxyethyl) ammonium group, and an alkylpyridinium group such as methylpyridinium group, ethylpyridinium group, propylpyridinium group and butylpyridinium group; and because of stability and ease of reaction, trimethylammonium group, triethylammonium group, dibutylmethylammonium group, methylpyridinium group, ethylpyridinium group and butylpyridinium group are preferable. On the other hand, the quaternary phosphonium group includes triphenylphosphonium group, tripropylphosphonium group, tributylphosphonium group, trioctylphosphonium group and the like, and because of stability and ease of reaction, triphenylphosphonium group and tributylphosphonium group are preferable.

Process for obtaining the anion-exchange membrane having halogeno ion as its counterion is not limited and any process to satisfy the above requirements may be applicable. Normally, any one selected from the following methods a) to c) is adopted.

[Method a) in which raw membrane having a halogenoalkyl group for forming an anion-exchange membrane is reacted with an agent having a tertiary amino, group for forming quaternary ammonium,
or an agent having a tertiary phosphine group for forming quaternary phosphonium]

In the present invention, raw membrane for forming an anion-exchange membrane is a membrane-like material formed by resin which is raw material for an anion-exchange membrane, and is made of polymeric material able to have an anion-exchange group due to some treatment and convertible to the anion-exchange membrane. In the method a), raw membrane having a halogenoalkyl group for forming an anion-exchange membrane is used as the raw membrane for forming an ion-exchange membrane. The raw membrane having a halogenoalkyl group for forming an anion-exchange membrane can preferably be produced by polymerizing a monomer having a functional group introducible of a halogenoalkyl group to obtain a membrane-like material, followed by introducing a halogenoalkyl group to the above functional group introducible of a halogenoalkyl group, or by polymerizing a monomer having a halogenoalkyl group to obtain a membrane-like material.

As a halogenoalkyl group, chloromethyl group, chloroethyl group, chloropropyl group, chlorobutyl group, chloropentyl group, chlorohexyl group, bromomethyl group, bromoethyl group, bromopropyl group, bromobutyl group, bromopentyl group, bromohexyl group, iodomethyl group, iodoethyl group, iodobutyl group, or a combination thereof may be illustrated. Among these, as the halogenoalkyl group, chloromethyl group, chloroethyl group, chloropropyl group, chlorobutyl group, bromoethyl group and bromobutyl group are preferable because of ease of introduction and availability of raw materials, and chloromethyl group, bromoethyl group and bromobutyl group are more preferable.

Since the halogenoalkyl group can be introduced to an aromatic hydrocarbon group through halogenomethylation reaction and the like, an aromatic vinyl compound such as styrene, a-methyl styrene and vinylnaphthalene may normally be mentioned as the monomer having a functional group introducible of a halogenoalkyl group. Because of ease of introduction of a halogenoalkyl group, styrene and a-methyl styrene are preferably used. Also, as the monomer having a halogenoalkyl group, there may be used chloromethyl styrene, chloro ethyl styrene, chloropropyl styrene, chlorobutyl styrene, bromomethyl styrene, bromoethyl styrene, bromopropyl styrene, bromobutyl styrene, etc.

For polymerizing the monomer to obtain a membrane-like material, copolymerizable crosslinkable monomer is commonly used. The use of the crosslinkable monomer is preferable because it allows the obtained anion-exchange membrane to have a cross-linked structure, which results in improving insolubility to fuel. The crosslinkable monomer is not particularly limited, and for example, there may be used divinylbenzenes, polyfunctional vinyl compounds such as divinyl sulfone, divinylbiphenyl and trivinylbenzene, polyfunctional methacrylic acid derivatives such as trimethylolmethane trimethacrylic acid ester, methylenebisacrylamide and hexamethylene dimethacrylamide.

The used amount of the crosslinkable monomer is generally preferably 0.01 to 60 parts by mass, more preferably 0.05 to 30 parts by mass, to 100 parts by mass of the monomer having a functional group introducible of a halogenoalkyl group or the monomer having a halogenoalkyl group. When the crosslinkable monomer is less than 0.01 part by mass, the obtained anion-exchange membrane may easily be soluble in water. On the other hand, when the crosslinkable monomer is more than 60 parts by mass, the content of the quaternary ammonium group or quaternary phosphonium group may be reduced to cause insufficient ion conductivity of the obtained anion-exchange membrane.

Furthermore, other monomers copolymerizable to these monomers may be added if desired. As the other monomers, for example, a vinyl compound such as ethylene, propylene, butylene, acrylonitrile, vinyl chloride and acrylic acid ester may be mentioned. The amount used is preferably 0 to 100 parts by mass per 100 parts by mass of the monomer having a functional group introducible of a halogenoalkyl group or the monomer having a halogenoalkyl group.

For polymerizing the monomer to produce the raw membrane for forming an anion-exchange membrane, it is preferable to use a method including impregnating a porous membrane with a monomer followed by polymerization, as disclosed in the Japanese Unexamined Patent Publication 2007-234302. As the porous membrane, a membrane made of polyolefin resin such as polyethylene, polypropylene and polymethylpentene is preferable, and polyethylene membrane is more preferable. The average pore diameter is preferably 0.01 to 10 μm, more preferably 0.05 to 0.5 μm; the porosity is preferably 20 to 90%, more preferably 30 to 60%; and the thickness is preferably 5 to 300 μm, more preferably 8 to 50 μm.

For the polymerization, there may be used known polymerization methods such as solution polymerization, suspension polymerization and emulsion polymerization in addition to thermal polymerization. The production conditions may be influenced by the composition of the monomer compound and the like, and properly selected without any particular limitation. For example, in the case of using the above exemplified monomer such as styrene, it is preferable to polymerize under polymerization conditions so as to have weight average molecular weight of 10,000 or more, preferably 200,000 or more.

When the monomer having a halogenoalkyl group is used, it is possible to obtain the raw membrane having a halogenoalkyl group for forming an anion-exchange membrane used in the present invention by thus performing the polymerization. Also, when the monomer having a functional group introducible of a halogenoalkyl group is used, the halogenoalkyl group may be introduced into the above functional group introducible of a halogenoalkyl group of the obtained membrane-like material. For the above treatment for introducing the halogenoalkyl group, common methods may be applicable, and for example, the raw membrane having a halogenoalkyl group for forming an anion-exchange membrane can be obtained by immersing the membrane-like material in an organic solvent such as chloroform, adding chloromethyl methyl ether and a catalyst such as zinc chloride and tin chloride, and reacting at 20 to 50° C. for 0.5 to 10 hours when introducing a chloromethyl group.

Also, the raw membrane for forming an anion-exchange membrane used in the method a) may be produced by a method comprising shaping resin having a functional group introducible of a halogenoalkyl group to obtain a membrane-like material, and introducing a halogenoalkyl group to the above functional group introducible of a halogenoalkyl group, or a method comprising shaping resin having a halogenoalkyl group to obtain a membrane-like material. As the resin having a functional group introducible of a halogenoalkyl group, resin having an aromatic hydrocarbon group can be used, and specific examples may include polystyrenes such as polystyrene and poly(a-methyl styrene), or polyphenylene oxide, polyether ether ketone and the like because the functional group introducible of a halogenoalkyl group is normally aromatic hydrocarbon group as mentioned above.

On the other hand, for the resin having a halogenoalkyl group, any resin to which the above-mentioned group is bonded can be used without limitation, and for example, there can be used base resin to which the above group is bonded and which is made of engineering plastic such as polystyrenes, polyphenylene oxide, polyether sulfone and polyether ether ketone. Examples may include polychloromethyl styrene, poly(styrene-chloromethyl styrene) copolymer, polybromoethyl styrene, polybromobutyl styrene, chloromethylated polysulfone, chloromethylated polyphenylene oxide, chloromethylated polyether ether ketone and the like. Note that commercially available resin can be used as the resin having a halogenoalkyl group.

The membrane-like material may be obtained by first dissolving the resin in an organic solvent, pouring the same into flat petri dish and the like and evaporating the organic solvent. The membrane-like material may also be obtained by a method in which the resin is compressed with flat board and the like while heating the same.

Note that the above-mentioned treatment for producing the raw membrane for forming an anion-exchange membrane by using the monomer having a functional group introducible of a halogenoalkyl group may be applicable to introduction of the halogenoalkyl group to the functional group when the membrane-like material is obtained by shaping the resin having a functional group introducible of a halogenoalkyl group.

In the method a), an anion-exchange membrane including a quaternary ammonium group or quaternary phosphonium group having a halogeno ion as its counterion is prepared by reacting thus—produced raw membrane having a halogenoalkyl group for forming an anion-exchange membrane with an agent having a tertiary amino group for forming quaternary ammonium or an agent having a tertiary phosphine group for forming quaternary phosphonium. Specific examples of the agent having a tertiary amino group for forming quaternary ammonium may include trimethylamine, triethylamine, dimethylaminoethanol and the like, or a combination thereof, and among the above examples, because of high reactivity, trimethylamine is most preferable. Also, specific examples of the agent having a tertiary phosphine group for forming quaternary phosphonium may include triphenylphosphine, tripropylphosphine, tributylphosphine and the like, or a combination thereof, and triphenylphosphine and tributylphosphine are most preferable because of high reactivity and stability of the product.

Process and conditions for the quaternarizing reaction may be properly selected depending on the type of the raw membrane for forming an anion-exchange membrane, the agent for forming quaternary ammonium or the agent for forming quaternary phosphonium. Normally, the raw membrane having a halogenoalkyl group for forming an anion-exchange membrane is immersed in a solution of acetone, chloroform and the like including 0.5 to 40 mass % of the agent for forming quaternary ammonium or agent for forming quaternary phosphonium, followed by reaction at 5 to 50° C. for 0.5 to 100 hours.

[Method b) in which raw membrane having an amino group or phosphine group for forming an anion-exchange membrane is reacted with an alkylating agent having a halogenoalkyl group]

Raw membrane for an anion-exchange membrane used in the method b) can be similar to the raw membrane for forming an anion-exchange membrane used in the above method a) except for having an amino group or phosphine group instead of a halogenoalkyl group. The amino group may be a tertiary amino group, or a secondary or primary amino group, and the tertiary amino group is particularly preferable. Similarly, the phosphine group may be a tertiary phosphine group, or a secondary or primary phosphine group, and the tertiary phosphine group is particularly preferable.

As the tertiary amino group, for example, there may be mentioned dimethylamino group, diethylamino group, dipropyl amino group, dibutyl amino group, di(hydroxylethyl) amino group, di(hydroxylpropyl)amino group, di(hydroxylbutyl)amino group, pyridyl group, etc. For a monomer having such a tertiary amino group, for example, there may be mentioned allyldimethylamine, allyldiethylamine, allyldipropylamine, allyldibutylamine, allyl-di(hydroxyethyl)amine, dimethylamino styrene, diethylamino styrene, vinylpyridine, vinylpyrazine, vinylimidazole, etc. The resin having a tertiary amino group may include polyvinylpyridine, polyvinylpiperazine, dimethylpolyaniline, polyallyldimethylamine and the like.

Also, as the secondary amino group, for example, there may be mentioned N-methylamino group, N-ethylamino group, N-propylamino group, N-butylamino group, N-hydroxylethylamino group, N-hydroxylpropylamino group, N-hydroxylbutylamino group, pyrrolidyl group, etc. The resin having such a secondary amino group can be produced by polymerizing monomers having a secondary amino group. For the monomer having a secondary amino group, for example, there may be mentioned N-allylmethylamine, N-allylethylamine, N-allylpropyl amine, N-allylbutyl amine, N-allylhydroxyethylamine, N-methylamino styrene, N-ethylamino styrene, 2-vinylpyrrolidine, 3-vinylpyrrolidine, etc. The resin having a secondary amino group may specifically include poly(N-allylmethylamine), poly(N-allylethylamine), poly(N-methylamino styrene), polyvinylpyrrolidine and the like.

Also, as the primary amino group, an amino group may be mentioned. The resin having such a primary amino group can be produced by polymerizing monomers having a primary amino group. For the monomer having a primary amino group, for example, there may be mentioned vinylamine, allylamine, amino methylstyrene, aniline, etc. The resin having a primary amino group may specifically include polyvinylamine, polyallylamine, polyamino methylstyrene, polyaniline and the like.

On the other hand, as the tertiary phosphine group, for example, there may be mentioned diphenylphosphine group, dipropylphosphine group, dibutylphosphine group, etc. For a monomer having a tertiary phosphine group, for example, there may be mentioned allyldiphenylphosphine, allyldipropyl phosphine, allyldibutyl phosphine, vinylbenzodipropyl phosphine, etc. The resin having a tertiary phosphine group may include polyallyldipropyl phosphine, polyallyldibutyl phosphine, polyallyldiphenylphosphine and the like.

Also, as the secondary phosphine group, for example, there may be mentioned phenylphosphine group, propylphosphine group, butylphosphine group, etc. The resin having such a secondary phosphine group can be produced by polymerizing monomers having a secondary phosphine group. For the monomer having a secondary phosphine group, for example, there may be mentioned allylphenylphosphine, allylpropyl phosphine, allylbutyl phosphine, vinylbenzylpropyl phosphine, etc. The resin having a secondary phosphine group may specifically include polyallylpropyl phosphine, polyallylbutyl phosphine and the like.

Also, as the primary phosphine group, a phosphine group may be mentioned. The resin having such a primary phosphine group can be produced by polymerizing monomers having a primary phosphine group. For the monomer having a primary phosphine group, for example, there may be mentioned phosphinoallyl, phosphinostyrene, etc. The resin having a primary phosphine group may specifically include polyphosphinoallyl, polyphosphinostyrene and the like.

In the method b), the above raw membrane for forming an anion-exchange membrane may be reacted with an alkylating agent having a halogenoalkyl group to generate anion-exchange membrane including a quaternary ammonium group or quaternary phosphonium group having a halogeno ion as its counterion by the following method. Specific examples for the alkylating agent having a halogenoalkyl group may include methyl chloride, ethyl chloride, propyl chloride, isopropyl chloride, butyl chloride, chlorobenzene, chloromethylbenzene, methyl bromide, ethyl bromide, propyl bromide, isopropyl bromide, butyl bromide, bromobenzene, bromomethylbenzene, methyl iodide, ethyl iodide and the like.

Process and conditions for the alkylation reaction may be properly selected depending on the type of the raw membrane for forming an anion-exchange membrane and alkylating agent. Normally, the reaction can be conducted by immersing the raw membrane having an amino group or phosphine group for forming an anion-exchange membrane in a solution of acetone, chloroform and the like including 0.5 to 50 mass % of alkylating agent, followed by reaction at 5 to 50° C. for 0.5 to 100 hours.

[Method c) in which a polymerizable composition comprising a polymerizable monomer including a quaternary ammonium group or quaternary phosphonium group having a halogeno ion as its counterion is polymerized]

In the method c), the polymerizable monomer including a quaternary ammonium group or quaternary phosphonium group having a halogeno ion as its counterion can be obtained by various methods. For example, it is obtained through reaction of a monomer having a halogenoalkyl group with an agent having a tertiary amino group for forming quaternary ammonium or agent having a tertiary phosphine group for forming quaternary phosphonium.

As examples of the monomer having a halogenoalkyl group may include chloromethylstyrene, bromoethyl styrene, bromobutyl styrene, allyl chloride, allyl bromide and the like. In view of reactivity, chloromethylstyrene is preferable. For a method for reaction of the monomer having a halogenoalkyl group with the above agent for forming quaternary ammonium or agent for forming quaternary phosphonium, a method pursuant to the method for reacting the raw membrane having a halogenoalkyl group for forming an anion-exchange membrane with these agents as explained in the above method a) may be applicable.

For a method for polymerizing the monomers including a quaternary ammonium group or quaternary phosphonium group having a halogeno ion as its counterion to generate the anion-exchange membrane, similar methods may be applicable as with the method for polymerizing the monomers having a functional group introducible of a halogenoalkyl group or the monomers having a halogenoalkyl group to generate a membrane-like material as explained in the above method a).

Through the above methods a) to c), anion-exchange membrane including a quaternary ammonium group or quaternary phosphonium group having a halogeno ion as its counterion can be obtained.

The anion-exchange capacity of the halogen type anion-exchange membrane is not particularly limited, and may be 0.1 to 5.0 mmol/g, preferably 0.5 to 3.0 mmol/g. When the anion-exchange capacity is 0.1 mmol/g or more, the ion conductivity of the anion-exchange membrane may be more sufficient. Also, when the anion-exchange capacity is 5.0 mmol/g or less, the membrane may have favorable mechanical strength without excessive swelling by water, methanol and the like, so that it is easy to maintain a structure suitable for the cell. In view of reduced electric resistance and necessary mechanical strength for a support membrane, the thickness of the anion-exchange membrane is normally preferably 1 to 200 μm, more preferably 5 to 150 μm.

In the present invention, the above halogen type anion-exchange membrane is then brought into contact with carbonate solution and/or bicarbonate solution to ion-exchange at least a part of counterions of the anion-exchange membrane to $CO_3^{2-}$ and/or $HCO_3^-$. For using in the carbonate solution, any known carbonate can be used without limitation, and specific examples may include sodium carbonate, potassium carbonate, potassium sodium carbonate, ammonium carbonate, etc. Also, for using in the bicarbonate solution, any known bicarbonate can be used without limitation, and specific examples may include sodium bicarbonate, potassium bicarbonate, ammonium bicarbonate, etc. As a solvent for dissolving the carbonate or bicarbonate, water, lower alcohol solution such as methanol and ethanol and mixed solution of water and lower alcohol can be used.

Considering that $CO_3^{2-}$ type counterion is ready to be converted to $HCO_3^-$ type in the air as explained above, bicarbonate solution is more preferable as the above carbonate solution and bicarbonate solution because the solution is more weakly basic and ion-exchange can be done under particularly mild conditions, resulting in highly inhibiting degradation of the quaternary ammonium group and quaternary phosphonium group. Because of ease of preparation and ease of proceeding of ion-exchange, aqueous solutions of sodium bicarbonate and potassium bicarbonate are most preferable.

In the carbonate solution and bicarbonate solution, concentrations of the carbonate and bicarbonate are not particularly limited, and may normally be 0.05 to 2 mol/L, preferably 0.1 to 1 mol/L, to immediately and sufficiently ion-exchange the halogeno ion. The contact temperature with the carbonate solution and bicarbonate solution is normally 5 to 80° C., preferably 15 to 60° C. In the common contact method, the anion-exchange membrane to be treated is immersed in the carbonate solution and bicarbonate solution. For the immersing step, carbonate solution and bicarbonate solution may be used in large excess to the anion-exchange membrane to be treated, and in general, it is preferable to use the carbonate solution and bicarbonate solution in weight of 1 to 100 times larger than the weight of the anion-exchange membrane. Furthermore, another preferable embodiment includes repeating the ion-exchange 2 to 5 times while changing the solution for contact to new one in the above conditions.

The contact time with the halogen type anion-exchange membrane is normally selected from the range of 0.1 to 20 hours. Since the carbonate ion and bicarbonate ion are more readily ion-exchanged than the hydroxy-ion as mentioned above, ion-exchange of the counterion can be completed at higher speed when the above carbonate solution and bicarbonate solution are used. As a result, it is possible to obtain a sufficiently ion-exchanged membrane even for a short contact time of preferably 1 to 8 hours, more preferably 0.7 to 3 hours, which is preferable.

At least a part of the counterions of the quaternary ammonium base is converted to $CO_3^{2-}$ and/or $HCO_3^-$ by the contact with the carbonate solution and/or bicarbonate solution. It is preferable to convert at least 70 mol % or more of the counterions to the carbonate/bicarbonate ions for ensuring sufficient conductivity of hydroxy-ion and electrode reactivity, and it is particularly more preferable to convert 90 mol % or more of the counterions to the carbonate/bicarbonate ions.

The anion-exchange membrane produced by the method of the present invention is, if necessary, subjected to washing, cutting and the like, and can be used as a solid polymer electrolyte membrane of an anion-exchange membrane type fuel cell in accordance with common methods. Namely, a fuel chamber side catalyst electrode layer and an oxidizing agent chamber side catalyst electrode layer are formed on respective surfaces of the anion-exchange membrane to prepare an anion-exchange membrane-catalyst electrode assembly, and then, the obtained assembly is installed in the anion-exchange membrane type fuel cell having a basic structure as shown in the FIG. 1.

For preparing the anion-exchange membrane-catalyst electrode assembly, various methods may be applicable. For example, there may be mentioned a method (I) in which an electrode catalyst is, if necessary, added with bonding agent or, dispersion media to turn into a paste composition, which is then directly formed into a roll or applied onto a support layer material such as carbon paper followed by heat treatment to obtain a layered substance, a solution of an ion conductivity providing agent including anion conductivity resin is, if necessary, applied for impregnation onto a joining surface of the layered substance to be joined to the anion-exchange membrane followed by drying if necessary, and the anion-exchange membrane is thermally compressed on the above joining surface of the layered substance; or a method (II) in which an electrode catalyst is added with ion conductivity providing agent and if necessary bonding agent or dispersion media to turn into a paste composition, which is applied onto a support layer material such as carbon paper or onto removable film to transfer onto the anion-exchange membrane, or directly applied onto the anion-exchange membrane, followed by drying and if necessary, thermocompression with the anion-exchange membrane.

A variety of materials used in the above methods (I) and (II) is not particularly limited, and any material used in the conventional polymer electrolyte type fuel cell can be used without any limitation.

Also, known materials for the catalyst electrode layer can be used without particular limitation. Namely, metallic particle accelerating oxidation reaction of hydrogen and reduction reaction of oxygen, such as platinum, gold, silver, palladium, iridium, rhodium, ruthenium, tin, iron, cobalt, nickel, molybdenum, tungsten and vanadium, or alloy thereof, can be used without any limitation as the electrode catalyst, and in view of excellent catalyst activity, it is preferable to use a platinum-group catalyst.

Also, it is possible to use a variety of metal oxides as the electrode catalyst because the anion-exchange membrane is used, which are not applicable to conventional strongly acidic cation-exchange membrane. For example, perovskite-type oxide expressed by $ABO_3$ which is excellent in oxidative activity can preferably be used. Specifically, the perovskite type oxide such as $LaMnO_3$, $LaFeO_3$, $LaCrO_3$, $LaCoO_3$ and $LaNiO_3$ can preferably be used as the electrode catalyst as well as those in which A site of the, above exemplified oxides is partially substituted by Sr, Ca, Ba, Ce, Ag and the like, and those in which B site of the above exemplified oxides is partially substituted by Pd, Pt, Ru, Ag and the like.

Note that the particle diameter of the electrode catalyst is normally 0.1 to 100 nm, more preferably 0.5 to 10 nm.

Although smaller particle diameter results in increased performance, it is difficult to prepare those having a particle diameter of less than 0.5 nm; and when it is more than 100 nm, it is difficult to obtain sufficient catalyst performance. Note that the catalyst may preliminarily be supported by a conductive agent. As the conductive agent, any electron conducting substance can be used without particular limitation, and for example, it is common to use carbon black such as furnace black and acetylene black, activated carbon, black lead and the like, either alone or in combination thereof. Content of the electrode catalyst can be normally 0.01 to 10 mg/cm$^2$, more preferably 0.1 to 5.0 mg/cm$^2$, in terms of the mass of the electrode catalyst per unit area when the catalyst electrode layer is sheet-shaped.

Also, a variety of thermoplastic resin can generally be used as the binding agent added if desired, and preferably used thermoplastic resin may include polytetrafluoroethylene, polyvinylidene fluoride, tetrafluoroethylene-perfluoroalkyl vinyl ether copolymer, polyether ether ketone, polyether sulfone, styrene butadiene copolymer, acrylonitrile butadiene copolymer, etc. Content of the binding agent can preferably be 5 to 25 wt % of the above catalyst electrode layer. Also, the binding agent may be used alone or in combination of 2 or more.

Also, porous carbon materials, such as carbon fiber woven fabric and carbon paper, can normally be used as the supporting layer material used if necessary. Thickness of the supporting layer material can preferably be 50 to 300 μm, and its porosity can preferably be 50 to 90%. Normally, a paste composition containing the above electrode catalyst can be filled within void of the supporting layer material and bonded on the surface of the supporting layer material such that the obtained catalyst electrode layer has a thickness of 5 to 50 μm, so that the catalyst electrode layer can be formed.

Note that the anion conductivity providing agent is used for improving bonding property of the anion-exchange membrane and catalyst electrode layer and improving long-term durability, and is made of anion conductivity resin. The example may include hydrocarbon-based elastomer which has an anion-exchange group in its molecule and is hardly soluble in water and methanol as disclosed in the Japanese Unexamined Patent Publication 2002-367626, or solution or suspension thereof.

Also, an amount of the ion-conductivity providing agent used in the above methods (I) and (II) is not particularly limited, and in the above method (I), it is preferable to apply such that a content of the ion-conductivity providing agent of the present invention is 5 to 60 mass %, particularly 10 to 40 mass %, in the catalyst electrode layer within the range of 1 to 50% of the entire thickness based on the joining surface, in view of the effect for giving ion conductivity. Also, in the above method (II), it is preferable to apply such that a content of the ion-conductivity providing agent is 5 to 60 mass %, particularly 10 to 40 mass %, with respect to the total mass of the catalyst electrode layer.

Furthermore, the thermal compression bond for joining the catalyst electrode layer in the above methods (I) and (II) can be done with an apparatus able to apply pressure and heat, i.e. hot pressing machine, roll pressing machine and the like. Pressing temperature is generally 80° C. to 200° C. The pressure can depend on the thickness and hardness of the catalyst electrode layer, and normally be 0.5 to 20 MPa.

The anion-exchange membrane type fuel cell produced by using the anion-exchange membrane of the present invention commonly has the basic structure in the FIG. 1, but it is also obvious to use the anion-exchange membrane of the present invention for other anion-exchange membrane type fuel cells having any other known structure. For the fuel, hydrogen is most commonly used, and methanol, ethanol, ethylene glycol, dimethyl ether, hydrazine and the like may also be usable. Furthermore, when using the liquid fuel, a basic compound may be added into the liquid fuel. By adding the basic compound, ion conductivity may be given to the liquid fuel to obtain further higher output in some cases. As the basic compound, there may be illustrated potassium hydroxide, sodium hydroxide, potassium bicarbonate, sodium bicarbonate, etc. Adequate concentration to be added may be 0.05 to 3 mol/L.

EXAMPLES

Hereinafter, the present invention will be explained further in detail based on examples, but the present invention is not limited to the examples. Note that the properties of the anion-exchange membrane shown in the examples and comparative examples were measured by the following methods.

1) Ion-Exchange Capacity of Anion-Exchange Membrane

Each counterion type anion-exchange membrane was immersed in 0.5 mol/L-NaCl aqueous solution for 10 hours or more to convert the same to the chloride ion type, followed by drying under reduced pressure at 60° C. for 5 hours and cutting so as to have dry weight of 0.1 g. The anion-exchange membrane was converted to the nitrate ion type with 0.2 mol/L-NaNO$_3$ aqueous solution, and the quantity of the resulting free chloride ion was determined with a potentiometric titrator (COMTITE-900 of Hiranuma Sangyo Co., Ltd.) by using silver nitrate aqueous solution (mmol). The ion-exchange capacity was calculated by the following formula.

(Ion-Exchange Capacity)=(Quantitative Value Obtained by Titration)/0.1 [mmol/g]

2) Content Measurements of Hydroxy-Ion, Carbonate Ion and Bicarbonate Ion of Anion-Exchange Membrane The whole measurements were done in a glove box under nitrogen atmosphere.

Y g of the anion-exchange membrane was immersed in 100 ml of 1 mol/L-NaCl aqueous solution for 5 hours or more. The obtained immersion fluid was titrated with 0.1 mol/L-hydrochloric acid aqueous solution by using 0.1 mol/L-phenolphthalein ethanol solution as an indicator to measure titer (V1 ml) at the end point when the color changed from red to colorless. With this titration, neutralized amount of OH$^-$ ion and converting amount of CO$_3^{2-}$ ion to HCO$_3^-$ ion were measured. Then, the same immersion fluid was added with ethanol solution of a mixture of bromocresol green and methyl red (0.075 mass % of bromocresol green and 0.05 mass % of methyl red) as an indicator, and continuously titrated with 0.1 mol/L-hydrochloric acid aqueous solution to measure titer (V2 ml) at the end point when the color changed from green to orange. With this second titration, neutralized amount of HCO$_3^-$ ion was measured.

Note that the contents of OH$^-$ ion, CO$_3^{2-}$ ion and HCO$_3^-$ ion in the ion conductivity providing agent can be calculated as below when the titers V1 and V2 satisfy the following relations, respectively, because OH$^-$ ion and HCO$_3^-$ ion never coexist due to the relation of pKa.

(When V1>V2) only OH$^-$ ion and CO$_3^{2-}$ ion are present as ion species.

CO$_3^{2-}$ ion content=0.1×V2/Y [mmol/g]

OH$^-$ ion content=0.1×(V1−V2)/Y [mmol/g]

(When V1<V2) only $CO_3^{2-}$ ion and $HCO_3^-$ ion are present as ion species.

$CO_3^{2-}$ ion content=$0.1 \times V1/Y$ [mmol/g]

$HCO_3^-$ ion content=$0.1 \times (V2-V1)/Y$ [mmol/g]

(When V1=V2) only $CO_3^{2-}$ ion is present as ion species.

$CO_3^{2-}$ ion content=$0.1 \times V1/Y$ [mmol/g]

3) Content Measurement of Halogeno Ion of Anion-Exchange Membrane

Y g of the anion-exchange membrane was immersed in 10 ml of 0.2 mol/L-$NaClO_4$ aqueous solution for 5 hours or more. The obtained immersion fluid was diluted 100 times to measure an amount of halogeno ions (chlorine ion, bromine ion and iodine ion) by using anion chromatography (ICS-2000 of Nippon Dionex). The content of halogeno ion of the anion-exchange membrane was calculated from the obtained quantitative value (mmol) in the following way.

Halogeno ion content=(quantitative value of anion chromatography)$\times 1000/Y$ [mmol/g]

4) Ion Conductivity of Anion-Exchange Membrane

The anion-exchange membrane was immersed in 0.5 mol/L-NaOH aqueous solution for 10 hours or more to convert to hydroxy-ion type, followed by washing with pure water and drying at room temperature for 24 hours or more.

Using an insulating substrate where 5 platinum wires having line width of 0.3 mm were arranged apart from each other in parallel, the above platinum wires were pressed with a strip of the above anion-exchange membrane having a width of 2.0 cm wetted with pure water. This anion-exchange membrane was kept in a thermo-hygrostat at 40° C. to constantly maintain in wet condition, and AC impedance was measured when 1 kHz of alternate current was applied between the platinum wires.

AC impedance was respectively measured when platinum wire distance was changed from 0.5 to 2.0 cm, and an effect of contact resistance between the platinum wires and the anion-exchange membrane was eliminated by calculating specific resistance of film of the ion conductivity providing agent from a slope of impedance (slope between two terminals) plotted to the platinum wire distance. The platinum wire distance and measured impedance showed good linear relationship. The ion conductivity of the anion-exchange membrane was calculated from a slope between resistance poles and the membrane thickness based on the following formula.

Note that the thickness of the anion-exchange membrane was measured by sandwiching the anion-exchange membrane wetted with pure water between glass plates in this case. Also, the whole operation was done in a glove box under nitrogen atmosphere.

$s=1/\{S \times (L \times 2.0)\}$ s: ion conductivity [S/cm]
L: membrane thickness [cm]
S: slope between two terminals [O/cm]

5) Fuel Cell Output Test (Preparation of Anion Conductivity Providing Agent)

Polystyrene-poly(ethylene-butylene)-polystyrene triblock copolymer (SEBS) (weight average molecular weight of 30,000 and styrene content of 30 mass %), i.e. hydrocarbon-based thermoplastic elastomer, was dissolved in chloroform so as to have a concentration of 5 mass %, and added with chloromethyl methyl ether and anhydrous tin chloride so as to have respective concentrations of 40 times in mole and 0.3 time in mole per amount of styrene units in SEBS for reacting the same at 35° C. for 2 hours. Then, the reaction solution was put in a solution obtained by mixing 1,4-dioxane and water in equal mass to terminate the reaction, and further put in 30 mass % methanol aqueous solution to precipitate resin, followed by drying, so that chloromethyl group containing resin was obtained.

Next, the obtained chloromethyl group containing resin was dispersed in an aqueous solution including 3 mass % of trimethyl amine and 25 mass % of acetone, and agitated at room temperature for 1 day to convert the chloromethyl group of the chloromethyl group containing elastomer into a quaternary ammonium group. The reaction solution was agitated in 0.5 mol/L-hydrochloric acid for 1 hour, and filtered and separated to obtain chlorine type anion conductivity resin.

The anion-exchange capacity of the anion conductivity resin was 1.5 mmol/g. Thus-obtained chlorine type anion conductivity resin was dispersed in large excess of 0.5 mol/L-NaOH aqueous solution, and agitated at 25° C. for 10 hours to ion-exchange the counterion of the quaternary ammonium base from chloride ion to hydroxy-ion, followed by washing with ion-exchange water and drying at 30° C. for 3 days, so that an anion conductivity providing agent was obtained. The obtained anion conductivity providing agent was dissolved in 1-propanol for 3 hours in an autoclave at 130° C. so as to have a concentration of 5 mass % to obtain a solution of the anion conductivity providing agent.

(Preparation of Catalyst Electrode Layer)

The electrode catalyst constituted by carbon black in which 50 mass % of platinum having average particle diameter of 2 nm was supported was mixed with the above solution of the ion conductivity providing agent so as to have a mass ratio of ion conductivity providing agent and catalyst electrode equal to 1:4, so that a catalyst electrode layer forming compound was obtained. The obtained catalyst electrode layer forming compound was coated on carbon paper having a thickness of 200 μm and porosity of 80% so as to have a platinum amount of 0.5 mg/$cm^2$, followed by drying under atmospheric pressure at 25° C. for 15 hours and further drying under reduced pressure at 80° C. for 4 hours, so that a catalyst electrode layer having carbon paper as a support medium was prepared. The content of the ion conductivity providing agent in the catalyst electrode layer was 20 mass %. Also, the area of the catalyst electrode layer was 5 $cm^2$.

(Preparation of Anion-Exchange Membrane-Catalyst Electrode Membrane Assembly)

Thus-prepared catalyst electrode layer having carbon paper as a support medium was set on both surfaces of the anion-exchange membrane, thermally pressed at 100° C. under pressure of 5 MPa for 100 seconds, and then, left at room temperature for 2 minutes.

(Fuel Cell Output Test)

The obtained anion-exchange membrane-catalyst electrode layer assembly was installed in a fuel cell shown in FIG. 1. The temperature of the fuel cell was set at 50° C., hydrogen humidified at 50° C. was supplied to fuel electrode side at 50 ml/min, and air humidified at 50° C. was supplied to oxidizing agent electrode side at 200 ml/min, so that electric generation test was conducted. Terminal electric voltage of the cell was measured at current density of 0 A/$cm^2$ and 0.1 A/$cm^2$.

The method for preparing the anion-exchange membrane used in the following examples and comparative examples was summarized as below.

Manufacturing Examples 1 to 4

Production of Anion-Exchange Membrane by Method a) and Method b)

(Preparation of Raw Membranes for Anion-Exchange Membranes 1 to 3)

According to composition table shown as Table 1, a variety of monomers were mixed to obtain respective monomer compounds. 400 g of the obtained monomer compound was placed in 500 ml-glass container, into which the porous membrane (polyethylene-based, having weight average molecular weight of 250,000, membrane thickness of 25 μm, average pore diameter of 0.03 μm and porosity of 37%) was immersed.

Then, the porous membrane was taken out of the monomer compound, and 100 μm-polyester film was used as a remover to coat the both surfaces of the porous membrane, followed by polymerization under nitrogen pressure of 0.3 MPa at 80° C. for 5 hours. As a result, raw membranes for forming anion-exchange membranes 1 to 3 were respectively produced.

(Preparation of Anion-Exchange Membranes 1 to 4 including a Quaternary Ammonium Group or Quaternary Phosphonium Group having a Halogeno Ion as its Counterion)

The raw membranes for forming anion-exchange membranes 1 to 3 obtained in the above operation were respectively immersed in the solution of the compositions shown in Table 2, and left undisturbed at room temperature for 3 days to generate a quaternary ammonium group or quaternary phosphonium group, so that anion-exchange membranes 1 to 4 including a quaternary ammonium group or quaternary phosphonium group having a halogeno ion as its counterion (Anion-exchange membranes 1 to 4 in Table 2) were respectively produced.

Production Example 5

Production of Anion-Exchange Membrane by Method c)

10 mass % of chloromethyl styrene and 20 mass % of triethyl amine. were reacted in acetone solvent at 40° C. for 40 hours to obtain N,N,N-triethyl(vinylphenyl)methyl ammonium chloride. This was cooled to −5° C., recrystallized and isolated, followed by dissolving the same in toluene at a concentration of 10 mass %, and 0.005 mass % of 2,2-azobis (2-methyl butyronitrile) was further dissolved therein. After nitrogen bubbling, this solution was subjected to polymerization at 50° C. for 72 hours. The solution after polymerization was reprecipitated by pouring the same in excessive amounts of methanol followed by drying to obtain a solid matter. This solid matter was dissolved in tetrahydrofuran at a concentration of 40 mass %, and the solvent was dried after impregnation of porous membrane (polyethylene-based, having weight average molecular weight of 250,000, membrane thickness of 25 μm, average pore diameter of 0.03 μm and porosity of 37%). This operation was repeated several times to produce an anion-exchange membrane 5 including a quaternary ammonium group having a halogeno ion as its counterion.

Examples 1 to 5

(Production of Carbonate Type Anion-Exchange Membrane)

Thus-obtained anion-exchange membranes 1 to 5 having a halogeno ion as its counterion were respectively cut to have mass of 0.5 g, and brought into contact with 25 ml of a variety of carbonate or bicarbonate aqueous solutions having the concentrations and compositions shown in Table 3 in polyethylene bag. The contact reaction was done at 25° C. for 1 hour. By this operation, halogeno ion in the anion-exchange membrane was ion-exchanged to carbonate ion or bicarbonate ion in the aqueous solution. For the anion-exchange membrane immediately after the ion-exchange reaction, the type of the counterion and the measured content are summarized in Table 3.

Then, each anion-exchange membrane was taken out of polyethylene bag, and immersed in 500 ml of ion-exchange water to wash out adhered aqueous solution of salt, followed by drying for 24 hours in air. For the ion-exchange capacity, type of the counterion and its content, and ion conductivity of this membrane, respective measurement results are shown in Table 3. From Table 3, it was found that almost all of the ions included in the anion-exchange membrane were bicarbonate ions, and that halogeno ion was favorably removed as a result of immediate ion-exchange.

Furthermore, an anion-exchange membrane-catalyst electrode assembly was prepared by using the anion-exchange membrane, and fuel cell output test was conducted. The results are shown in Table 3.

Comparative Examples 1, 2 and 3

(Preparation of Hydroxy-Ion Type Anion-Exchange Membrane)

By using 0.1 g of the anion-exchange membrane and the aqueous solution of hydroxy-salt shown in Table 3, the same operation as in examples 1 to 5 was conducted to obtain an anion-exchange membrane in which its counterion was ion-exchanged. The results are shown in Table 3. By evaluating the type of counterions and content measurement for the anion-exchange membrane immediately after ion-exchange reaction, not only hydroxy-ion but also substantial amount of halogeno ions were detected. It shows insufficient ion-exchange of halogeno ions.

Also, as a result of evaluation of the type of counterion and content measurement in the ion-exchanged and dried anion-exchange membrane, it was found that the above hydroxy-ion was further converted to bicarbonate ion by leaving undisturbed for 24 hours in air. Also, the dried anion-exchange membrane was low in anion-exchange capacity showing a significant difference from the carbonate type anion-exchange membrane produced in the above examples.

The anion-exchange membrane was used to prepare an anion-exchange membrane-catalyst electrode assembly, and fuel cell output test was conducted. The results are shown in Table 3.

TABLE 1

| | Composition (parts by mass) | | | | | |
|---|---|---|---|---|---|---|
| | chloromethyl styrene | 4-vinyl-pyridine | 1-vinyl-imidazole | divinyl-benzene | ethylene glycol diglycidylether | t-butyl peroxy-ethyl hexanoate |
| raw membrane for forming an anion-exchange membrane 1 | 97 | 0 | 0 | 3 | 5 | 5 |
| raw membrane for forming an anion-exchange membrane 2 | 0 | 85 | 0 | 10 | 0 | 5 |
| raw membrane for forming an anion-exchange membrane 3 | 0 | 0 | 94 | 1 | 0 | 5 |

TABLE 2

| Name of membrane | Raw membrane used | Composition of solution for reaction | Ion-exchange group | Counterion of ion-exchange group |
|---|---|---|---|---|
| anion-exchange membrane 1 | raw membrane for forming an anion-exchange membrane 1 | 6 mass % of trimethylamine, 25 mass % of acetone, 69 mass % of water | trimethylammonium group | chlorine ion |
| anion-exchange membrane 2 | raw membrane for forming an anion-exchange membrane 1 | 3 mass % of tributylphosphorous, 97 mass % of acetone | tributylphosphonium group | chlorine ion |
| anion-exchange membrane 3 | raw membrane for forming an anion-exchange membrane 2 | 40 mass % of methyl iodide, 60 mass % of acetone | N-methylpyridinium group | iodine ion |
| anion-exchange membrane 4 | raw membrane for forming an anion-exchange membrane 3 | 30 mass % of ethyl bromide, 70 mass % of acetone | N-ethylimidazolium group | bromine ion |

TABLE 3

| | anion-exchange membrane | constitution of solution of hydroxy-salt for ion-exchange | counterion of anion-exchange membrane immediately after ion-exchange (Eq %) | | rate of counterion species after drying (Eq %) | | properties of anion-exchange membrane | | fuel cell output voltage | |
|---|---|---|---|---|---|---|---|---|---|---|
| | | | | | | | anion-exchange capacity (mmol/g) | ion conductivity (mS/cm) | 0 A/cm² | 0.1 A/cm² |
| Example 1 | anion-exchange membrane 1 | 0.1 mol/L KHCO₃ | HCO₃⁻ | 100 | HCO₃⁻ | 100 | 1.80 | 50 | 1.01 | 0.43 |
| Example 2 | anion-exchange membrane 1 | 0.1 mol/L Na₂CO₃ | CO₃²⁻ | 100 | HCO₃⁻ CO₃²⁻ | 94 6 | 1.75 | 48 | 0.98 | 0.41 |
| Comp. Example 1 | anion-exchange membrane 1 | 0.1 mol/L KOH | OH⁻ Cl⁻ | 68 32 | HCO₃⁻ CO₃²⁻ Cl⁻ | 65 3 32 | 1.67 | 40 | 0.89 | 0.25 |
| Example 3 | anion-exchange membrane 2 | 0.1 mol/L NaHCO₃ | HCO₃⁻ | 100 | HCO₃⁻ CO₃²⁻ | 98 2 | 1.40 | 25 | 0.88 | 0.18 |
| Comp. Example 2 | anion-exchange membrane 2 | 0.1 mol/L NaOH | OH⁻ Cl⁻ | 64 36 | HCO₃⁻ CO₃²⁻ Cl⁻ | 61 3 36 | 1.10 | 10 | 0.82 | 0.10 |
| Example 4 | anion-exchange membrane 3 | 2 mol/L NaHCO₃ | HCO₃²⁻ | 100 | HCO₃⁻ | 100 | 2.45 | 43 | 0.95 | 0.37 |
| Comp. Example 3 | anion-exchange membrane 3 | 2 mol/L KOH | OH⁻ I⁻ | 80 20 | HCO₃⁻ CO₃²⁻ I⁻ | 75 5 20 | 1.80 | 25 | 0.84 | 0.20 |
| Example 5 | anion-exchange membrane 4 | 1 mol/L K₂CO₃ | CO₃²⁻ | 100 | HCO₃⁻ CO₃²⁻ | 94 6 | 1.50 | 28 | 0.91 | 0.23 |
| Example 6 | anion-exchange membrane 5 | 0.05 mol/L K₂CO₃ | CO₃²⁻ | 100 | HCO₃⁻ CO₃²⁻ | 96 4 | 1.60 | 35 | 0.93 | 0.28 |

EXPLANATION OF SYMBOLS

1: cell bulkhead
2: fuel flow hole
3: oxidizing agent gas flow hole
4: fuel chamber side catalyst electrode layer
5: oxidizing agent chamber side catalyst electrode layer
6: solid polymer electrolyte membrane (anion-exchange membrane)
7: fuel chamber
8: oxidizing agent chamber

The invention claimed is:

1. A method for producing an anion-exchange membrane-catalyst electrode membrane assembly for a solid polymer electrolyte type fuel cell, comprising:
produced an anion-exchange membrane including a quaternary ammonium group or quaternary phosphonium group having a halogen ion as its counterion;
bringing the anion-exchange membrane into contact with carbonate solution and/or bicarbonate solution;
ion-exchanging the halogen ion to obtain an anion-exchange membrane in which at least a part of counterions of said quaternary ammonium group or quaternary phosphonium group is $CO_3^{2-}$ and/or $HCO_3^-$; and
forming a fuel chamber side catalyst electrode layer on a first surface and an oxidizing agent chamber side catalyst electrode layer on a second surface of the anion-exchange membrane.

2. The method for producing an anion-exchange membrane for a solid polymer electrolyte type fuel cell as set forth in claim 1,
wherein a method for producing the anion-exchange membrane comprises reacting a raw membrane having a halogenoalkyl group for forming an anion-exchange membrane with an agent having a tertiary amino group for forming quaternary ammonium or an agent having a tertiary phosphine group for forming quaternary phosphonium.

3. The method for producing an anion-exchange membrane for a solid polymer electrolyte type fuel cell as set forth in claim 1, wherein a method for producing the anion-exchange membrane comprises reacting a raw membrane having an amino group or phosphine group for forming an anion-exchange membrane with an alkylating agent having a halogenoalkyl group.

4. The method for producing an anion-exchange membrane for a solid polymer electrolyte type fuel cell as set forth in claim 1, wherein a method for producing the anion-exchange membrane comprises polymerizing a polymerizable composition comprising a polymerizable monomer including a quaternary ammonium group or quaternary phosphonium group having a halogen ion as its counterion.

5. The method for producing an anion-exchange membrane for a solid polymer electrolyte type fuel cell as set forth in claim 1, wherein bicarbonate solution is used as said carbonate solution and/or bicarbonate solution.

6. A method as set forth in claim 1, wherein the halogen ion comprises iodine.

7. A method as set forth in claim 1, wherein the halogen ion comprises bromine.

8. A method as set forth in claim 1, wherein the anion-exchange membrane has an anion-exchange capacity of 0.1 to 5.0 mmol/g.

9. A method as set forth in claim 1, wherein the anion-exchange membrane has a thickness of 5 to 150 μm.

10. A method as set forth in claim 1, wherein the carbonate solution and/or bicarbonate solution comprises potassium carbonate or potassium bicarbonate.

11. A method as set forth in claim 1, wherein the carbonate solution and/or bicarbonate solution comprises ammonium bicarbonate.

12. A method for producing an anion-exchange membrane-catalyst electrode membrane assembly for a solid polymer electrolyte type fuel cell, comprising:
producing an anion-exchange membrane including a quaternary phosphonium group having halogen ion as its counterion; and
bringing the anion-exchange membrane into contact with carbonate solution and/or bicarbonate solution to obtain an anion-exchange membrane in which at least a part of counterions of said quaternary phosphonium group is $CO_3^{2-}$ and/or $HCO_3^-$.

13. A method as set forth in claim 12, wherein the halogen ion comprises chlorine.

* * * * *